US012479126B2

(12) United States Patent
Ximenes et al.

(10) Patent No.: US 12,479,126 B2
(45) Date of Patent: Nov. 25, 2025

(54) APPARATUS FOR MAKING AND LAYING BRICKS

(71) Applicant: Astroport Space Technologies, Inc., San Antonio, TX (US)

(72) Inventors: Samuel Ximenes, San Antonio, TX (US); Isaac Olson, Kingsville, TX (US); Ronald Wells, Castroville, TX (US); John Michael Berringer, San Antonio, TX (US)

(73) Assignee: ASTROPORT SPACE TECHNOLOGIES, INC., San Antonio, TX (US)

( * ) Notice: Subject to any disclaimer, the term of this patent is extended or adjusted under 35 U.S.C. 154(b) by 0 days.

(21) Appl. No.: 18/431,295

(22) Filed: Feb. 2, 2024

(65) Prior Publication Data

US 2024/0173888 A1 May 30, 2024

Related U.S. Application Data

(63) Continuation of application No. 17/568,521, filed on Jan. 4, 2022, now Pat. No. 11,904,500.

(60) Provisional application No. 63/133,708, filed on Jan. 4, 2021.

(51) Int. Cl.

*B28B 3/00* (2006.01)
*B28B 3/26* (2006.01)
*E04G 21/16* (2006.01)

(52) U.S. Cl.

CPC .......... *B28B 3/2681* (2013.01); *B28B 3/2654* (2013.01); *E04G 21/167* (2013.01)

(58) Field of Classification Search

None

See application file for complete search history.

(56) References Cited

U.S. PATENT DOCUMENTS 5,338,180 A 8/1994 Maule
2011/0002736 A1 1/2011 Monger et al.

*Primary Examiner* — Jacob T Minskey
*Assistant Examiner* — Adrien J Bernard
(74) *Attorney, Agent, or Firm* — Outlier Patent Attorneys, PLLC

(57) ABSTRACT

An apparatus for making and depositing bricks includes a nozzle having an inlet opening, an outlet opening, and a plurality of walls surrounding the outlet opening. At least one of the walls is configured to retract relative to the other walls. When a first brick is deposited, all of the nozzle walls are in the extended position. When subsequent bricks are deposited, one or more of the nozzle walls are retracted so that the form for the subsequent bricks is provided by the walls that are in the extended position and the sides of the already-deposited bricks. In this manner, the nozzle is configured to deposit the bricks directly adjacent to each other without any space or intervening material between them. The bricks may be deposited in a heated state and they meld together as they cool. The nozzle is particularly advantageous for paving autonomously in otherwise inaccessible locations, such as surfaces on the moon or other planets.

13 Claims, 16 Drawing Sheets

APPARATUS FOR MAKING AND LAYING BRICKS

CROSS-REFERENCE TO RELATED APPLICATIONS

This application claims the benefit of U.S. patent application Ser. No. 17/568,521, filed on Jan. 4, 2022, which claims the benefit of U.S. Provisional Application No. 63/133,708, filed on Jan. 4, 2021, the contents of both of which are incorporated herein by reference.

BACKGROUND

Field of the Art

This disclosure relates to an apparatus for making and laying bricks or pavers in a groutless manner. In particular, this disclosure relates to a large-scale nozzle for 3D printing bricks or pavers directly next to each other. Such an automated brick-laying process is particularly advantageous for paving autonomously in otherwise inaccessible locations, such as surfaces on the moon or other planets.

Discussion of the State of the Art

The process of laying bricks, pavers, or tiles is very labor-intensive work that takes a long time and causes a lot of stress and strain on workers' bodies. Further, these projects require the very heavy bricks, pavers, or tiles to be transported to a job site, which takes a lot of time and energy to haul these large, heavy loads. Bricks, pavers, and tiles typically require grout, cement, or other similar materials to fill the gaps between the bricks, pavers, or tiles. Adding the filler material between the bricks, pavers, or tiles is also very labor- and time-intensive. Another drawback is that the filler material may expand and contract at different rates than the bricks, pavers, or tiles, which may cause cracks or other structural problems.

Efforts have been made to automate bricklaying and paving. However, even if the bricklaying and paving can be effectively automated, the bricks or pavers still need to be transported to the job site and fed to the machine. In addition, filler material still has to be deposited between the bricks or pavers. As such, even if part of the bricklaying process can be automated, human intervention is still required.

There remains a need for an effective apparatus and method for laying bricks and pavers in an automated way that requires little human intervention.

SUMMARY

The present invention overcomes these limitations by automating the brick-making and brick-laying processes and by eliminating the need for grout or cement between the bricks. Such automated processes are especially useful for paving surfaces on the moon or other planets but are also useful on Earth for minimizing the time and cost associated with human work hours and for minimizing the impact on the environment associated with transporting large, heavy loads of bricks, pavers, or tiles.

Since the bricks are made and deposited at the same time using the apparatus disclosed herein, the need for transporting large, heavy loads of bricks or pavers is eliminated. That is, the bricks can be made from materials available at the job site, such as dirt, dust, clay, and the like, as traditionally done by artisans prior to the mass centralization of brick production. In accordance with the present invention, and in contrast to previous methods, a large-scale 3D printer nozzle deposits bricks or pavers directly adjacent to each other without any other materials, such as grout or concrete, disposed between the bricks or pavers. The material of the bricks or pavers is preferably in a semi-solid, semi-liquid, or molten state so that the bricks or pavers meld together as they cool or cure. These bricks may also be surfaced in a fluxing agent prior to deposition in order to promote brick-to-brick adhesion.

In one disclosed embodiment, an apparatus for making and depositing bricks includes a nozzle having an inlet opening, an outlet opening, and a plurality of walls surrounding the outlet opening. At least one of the walls is configured to lift up relative to the other walls. When a first brick is deposited, all of the nozzle walls are in the down position. When subsequent bricks are deposited, one or more of the nozzle walls are lifted. The nozzle walls that are lifted are those that are adjacent to already-deposited bricks. As such, the sides of the already-deposited bricks, along with the nozzle walls that are in the down position, serve as the form for the brick that is being deposited.

One embodiment of the present invention is directed to an apparatus for making and depositing bricks. The apparatus includes a nozzle having an inlet opening, an outlet opening, and a conduit extending between the inlet opening and the outlet opening. The outlet opening may have a diameter of approximately 100-200 mm. The conduit may have a longitudinal axis and a plane of the outlet opening may be perpendicular to the longitudinal axis of the conduit. The nozzle is configured so that brick material added to the nozzle through the inlet opening flows through the conduit and exits the nozzle through the outlet opening.

The apparatus further includes a plurality of walls surrounding the outlet opening, wherein at least one of the walls is configured to retract relative to the other walls. The apparatus may further include at least one lifting mechanism coupled to the respective at least one wall that is configured to retract. The at least one lifting mechanism may include a linear actuator. The plurality of walls may include at least three walls. The plurality of walls may include six walls, wherein three of the walls may be stationary and three of the walls may be moveable and have a retracted position and an extended position. The apparatus may further include a plurality of vertices between the respective plurality of walls.

Another embodiment of the present invention is directed to a method for making and depositing pavers. The method includes using a nozzle to deposit a first brick, wherein the nozzle comprises an inlet opening, an outlet opening, and a plurality of walls surrounding the outlet opening, wherein at least one of the walls is configured to lift up relative to the other walls, and wherein all of the walls are in an extended position during deposition of the first brick. The step of using the nozzle to deposit the first brick may further include adding brick material to the nozzle through the inlet opening; and depositing the brick material out of the nozzle through the outlet opening.

The method further includes moving the nozzle to a second location that is adjacent to the first brick and retracting a first wall of the nozzle so that the first nozzle wall is in a retracted position and the other nozzle walls are in the extended position, wherein the retracted first nozzle wall is directly above a first sidewall of the first brick. The nozzle may further include a lifting mechanism coupled to the first nozzle wall, and retracting the first nozzle wall may include activating the lifting mechanism.

The method further includes depositing a second brick directly adjacent to the first brick so that a first sidewall of the second brick is in direct contact with the first sidewall of the first brick. The method may further include moving the nozzle to a third location that is adjacent to the first brick and the second brick; retracting the first nozzle wall and a second wall of the nozzle so that the first and second nozzle walls are in the retracted position and the other nozzle walls are in the extended position, wherein the retracted first nozzle wall is directly above a second sidewall of the first brick and the retracted second nozzle wall is directly above a second sidewall of the second brick; and depositing a third brick directly adjacent to the first brick and the second brick so that a first sidewall of the third brick is in direct contact with the second sidewall of the first brick and a second sidewall of the third brick is in direct contact with the second sidewall of the second brick.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
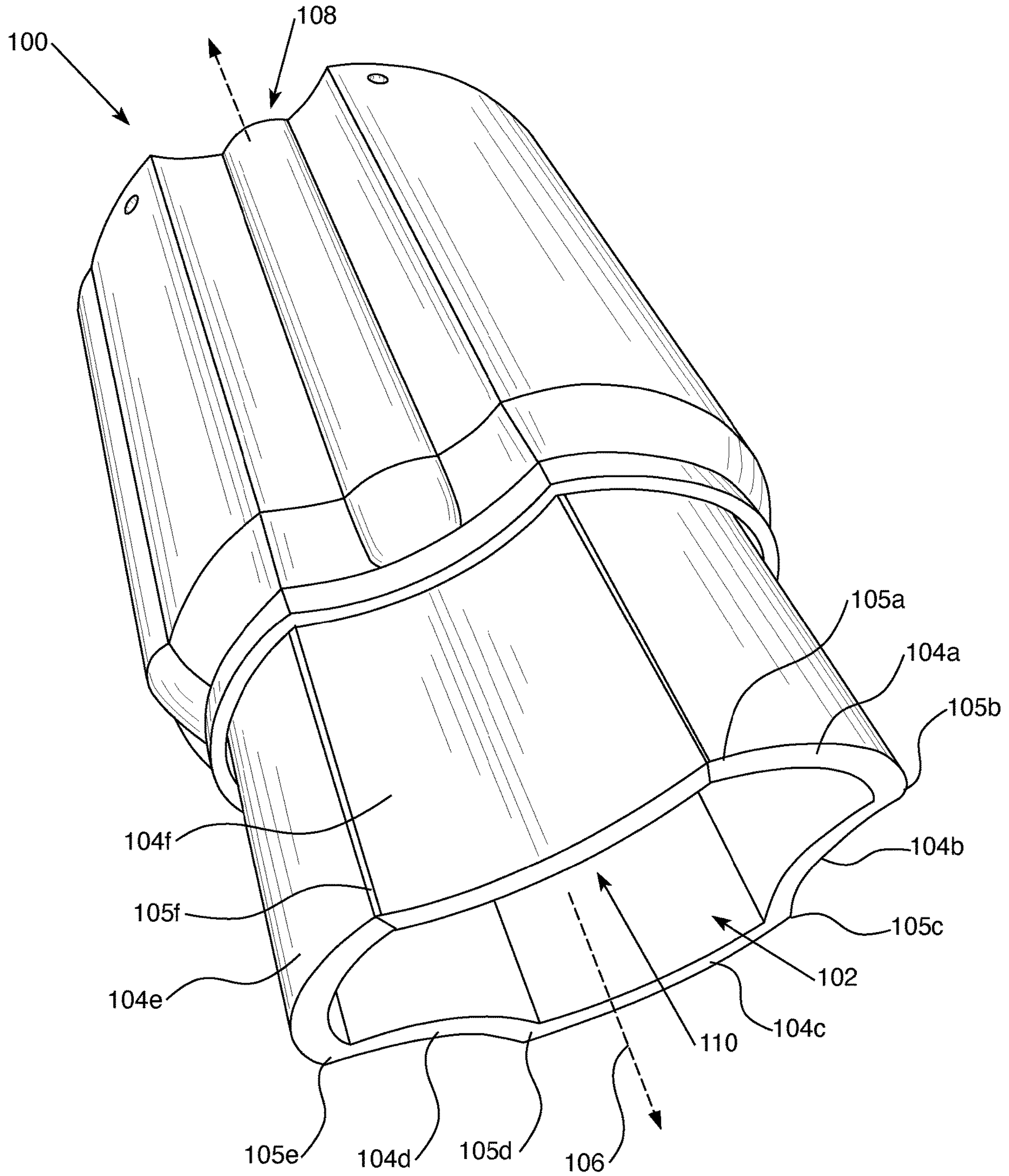
FIG. 1 is a perspective view of a nozzle with moveable walls, in accordance with an embodiment of the present invention.

The present invention is for a nozzle having walls surrounding the outlet of the nozzle, where at least one of the walls is configured to retract relative to the other walls. Such a nozzle can be used in a procedure for making and depositing bricks, pavers, tiles, etc. The lifting wall(s) of the nozzle allow for the bricks, pavers, tiles, etc to be deposited directly adjacent to each other without any intervening materials or space between them. In this manner, the need for grout, cement, or the like to be deposited in the space between the bricks is eliminated. The material used to form the bricks is preferably in a semi-solid, semi-liquid, and/or semi-molten state so that bricks that are adjacent to each other meld together as the material cools, solidifies, and/or cures. Further, human intervention is minimized in the automated process for laying bricks using the nozzle of the present invention. Another advantage of the nozzle of the present invention is that the bricks or pavers are made on-site, and the materials for making the bricks or pavers may be obtained directly from the job site, thereby eliminating the need to transport the bricks or pavers to the job site.

The nozzle of the present invention can be used for depositing bricks, pavers, tiles, or any other similar blocks used for paving a surface. The terms “bricks,” “pavers,” “tiles,” and “blocks” are used interchangeably herein to refer to any material that may be used for paving a surface.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Overview

The apparatus of the present invention is a large nozzle for 3D printing bricks or pavers. The nozzle has an inlet opening, an outlet opening, and a plurality of walls surrounding the outlet opening. Material for forming the bricks is added to the nozzle through the inlet and the material is deposited in the form of a brick through the outlet. One or more of the walls is configured to move up and down relative to the other walls. In this manner, the nozzle is configured to deposit bricks or pavers directly adjacent to each other with no space or intervening materials therebetween. When a brick or paver is deposited adjacent to one or more other bricks or pavers, the wall(s) of the nozzle that are adjacent to the already-deposited bricks or pavers moves up relative to the other walls. Thus, the already-deposited bricks or pavers are part of the form for subsequently deposited bricks or pavers. The bricks or pavers are deposited in a semi-liquid or semi-solid state so that the bricks or pavers meld together as they cure, cool, and/or solidify. These bricks may also be surfaced in a fluxing agent prior to deposition in order to promote brick-to-brick adhesion.

Apparatus

FIG. 1 illustrates one example of a nozzle 100 in accordance with an embodiment of the invention. In particular, FIG. 1 illustrates a large-scale nozzle 100 for making and depositing pavers. The nozzle 100 may be attached to a heater, material supply source, sensors, processors, pumps, controllers and/or the like, so that a material to be used for making bricks or pavers is deposited through the nozzle 100 in an automated way. The bricks or pavers are deposited in a liquid or semi-liquid form that solidifies as it cools.

The nozzle 100 includes an outlet opening 102 that is the desired shape of the bricks or pavers. The diameter of the opening 102 may be any desired diameter. For example, the diameter of the opening 102 may be between 50 mm and 300 mm, between 100 mm and 200 mm, or the like. The opening 102 lies in a plane that is perpendicular to a longitudinal axis 106 of the nozzle 100.

The nozzle 100 includes a plurality of walls 104*a*, 104*b*, 104*c*, 104*d*, 104*e*, 104*f* surrounding the opening 102. Some, if not all, of the walls 104*a*, 104*b*, 104*c*, 104*d*, 104*c*, 104*f* are configured to move up and down relative to each other. FIG. 1 depicts the nozzle 100 with all of the walls 104*a*, 104*b*, 104*c*, 104*d*, 104*c*, 104*f* in the down, or extended, position. One or more of the walls 104*a*, 104*b*, 104*c*, 104*d*, 104*c*, 104*f* may also have an up, or retracted, position. In other words, each one of the walls 104*a*, 104*b*, 104*c*, 104*d*, 104*c*, 104*f* may be able to retract relative to the other walls. Some of the walls may be stationary and only the remaining walls may be configured to move up and down relative to the stationary walls. For example, only one, two, or three of the walls may be configured to move up relative to the stationary walls, depending on the shape of the opening 102.

In the embodiment shown in FIG. 1, each wall 104 has a curved shape. Some of the walls 104*a*, 104*c*, 104*c* have a convex shape, while the remaining walls 104*b*, 104*d*, 104*f* have a concave shape. It should be well understood by one of ordinary skill in the art that the walls may have any desired shape. For example, rather than being curved, the walls may be straight, thereby defining a polygonal shaped outlet opening. In addition, it should be well understood by one of ordinary skill in the art that there may be any desired number of walls. While the example shown in FIG. 1 includes six walls, the nozzle 100 may alternatively have 3, 4, 5, 7, 8, or more walls. Depending on the number of walls and the shape of the walls, the opening 102 may be in the shape of a lobed hexagon (as shown in FIG. 1), triangle, square, rectangle, hexagon, pentagon, octagon, or any other desired shape.

In the embodiment shown in FIG. 1, the nozzle 100 includes vertices 105*a*, 105*b*, 105*c*, 105*d*, 105*c*, 105*f* at the points where the walls 104*a*, 104*b*, 104*c*, 104*d*, 104*c*, 104*f* come into contact with each other. The opening 102 may be any desired shape, but is preferably a shape that includes vertices so that the bricks can be deposited directly adjacent to each other with no space in between.

The nozzle 100 further includes an inlet opening 108 and a conduit 110 extending through the nozzle 100 in communication with the inlet opening 108 and the outlet opening 102. The conduit 110 has a longitudinal axis 106. The outlet opening 102 is in a plane that is perpendicular to the longitudinal axis 106. Brick material added to the nozzle 100 through the inlet opening 108 flows through the conduit 110 and out of the outlet opening 102 in order to deposit a brick in a desired location.

Figure 2A:
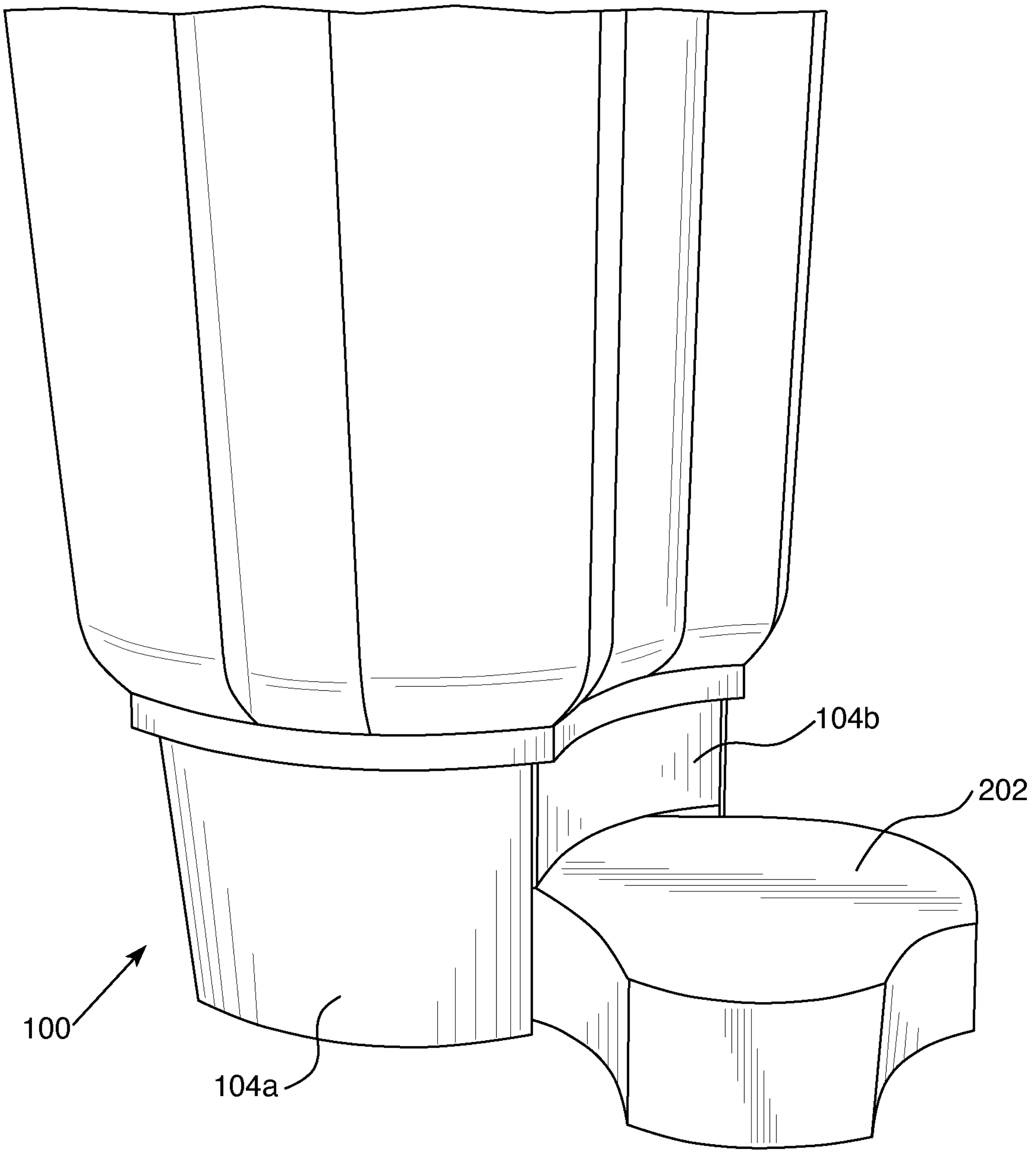
FIGS. 2A-2C illustrate a process for depositing pavers using the nozzle of FIG. 1, in accordance with an embodiment of the present invention.

FIG. 2A depicts a first brick 202 and the nozzle 100 in the process of depositing a second brick directly adjacent to the first brick 202. When the first brick 202 is deposited, all of the walls 104*a*, 104*b*, 104*c*, 104*d*, 104*e*, 104*f* of the nozzle 100 are in the extended position. That is, the walls 104*a*, 104*b*, 104*c*, 104*d*, 104*e*, 104*f* surrounding the outlet opening 102 serve as the form for the first brick 202. Material added to the nozzle 100 through the inlet opening 108 passes through conduit 110 in the nozzle 100 and is deposited through the outlet opening 102 onto a surface. The deposited material is a brick (e.g., first brick 202) in the shape of the outlet opening 102. As depicted in FIG. 2A, when the next brick is deposited directly adjacent to the first brick 202, one of the walls 104*b* is in the up position. The wall 104*b* is lifted relative to the other walls 104*a*, 104*c*, 104*d*, 104*e*, 104*f* so that the form of the brick being deposited is provided by the remaining walls 104*a*, 104*c*, 104*d*, 104*c*, 104*f*, and one of the sides of the first brick 202. The nozzle walls 104*a* and 104*c* on either side of the lifted wall 104*b* are in direct contact with the brick 202 so that the material being deposited does not leak out of a space between the nozzle walls and the brick sidewall. The bottom surface of the lifted wall 104*b* is directly above the sidewall of the brick 202 and may rest on top of the sidewall of the brick 202.

Figure 2B:
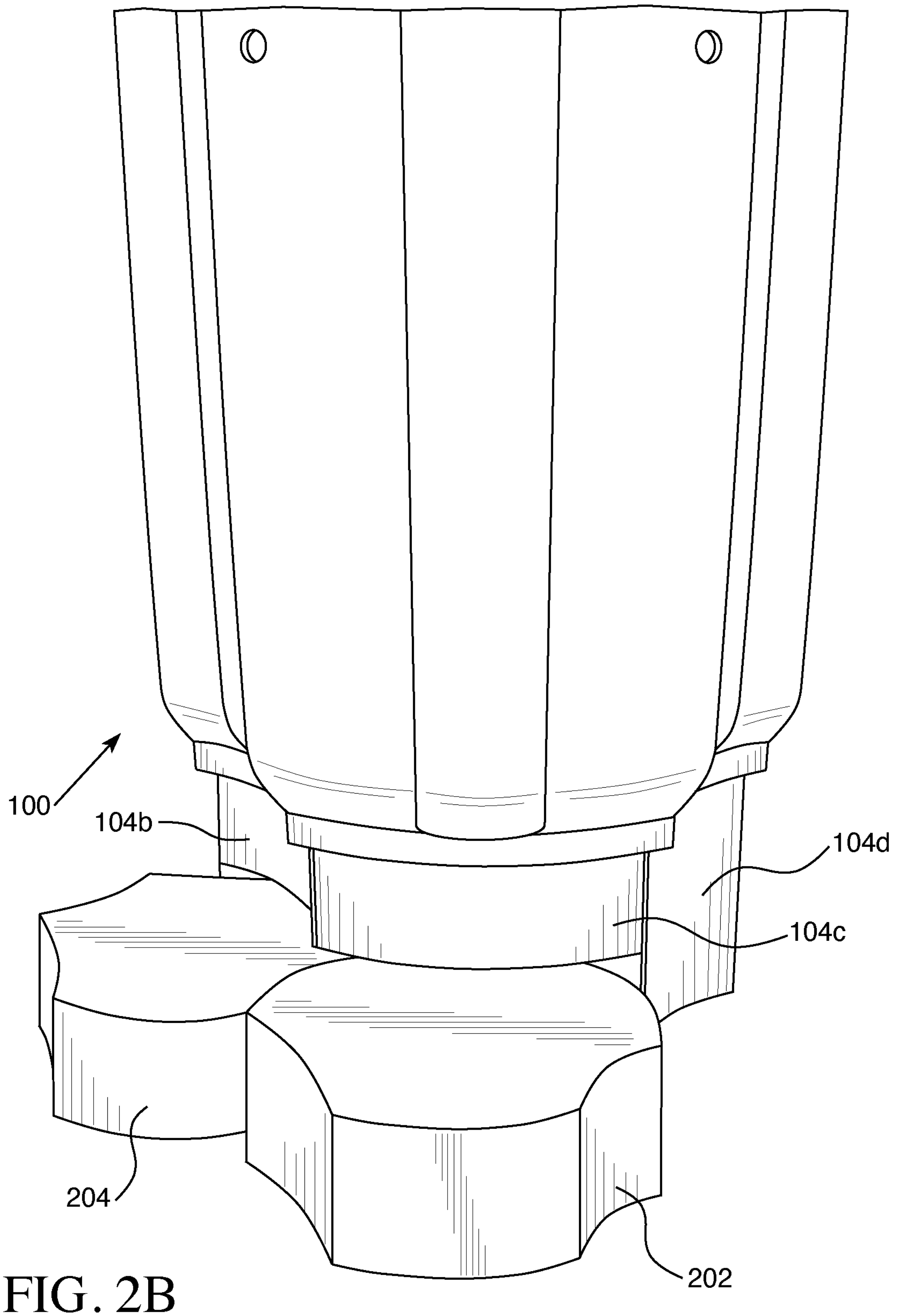

FIG. 2B depicts the first brick 202, a second brick 204, and the nozzle 100 in the process of depositing a third brick directly adjacent to the first brick 202 and the second brick 204. Two of the nozzle walls, 104*b* and 104*c*, are lifted when the third brick is extruded from the nozzle 100. Thus, the form of the third brick is provided by the remaining nozzle walls 104*a*, 104*d*, 104*c*, 104*f*, and one of the sides of each of the already-deposited bricks 202, 204. Again, the nozzle walls 104*a* and 104*d* on either side of the lifted nozzle walls 104*b*, 104*c* are in tight, direct contact with the bricks 204 and 202, respectively so that material being deposited during the process of forming the third brick does not leak out of a space between the nozzle walls 104*a*, 104*d* and the brick sidewalls. The bottom surfaces of the lifted walls 104*b* and 104*c* may rest, respectively, on the bricks 204 and 202.

Figure 2C:
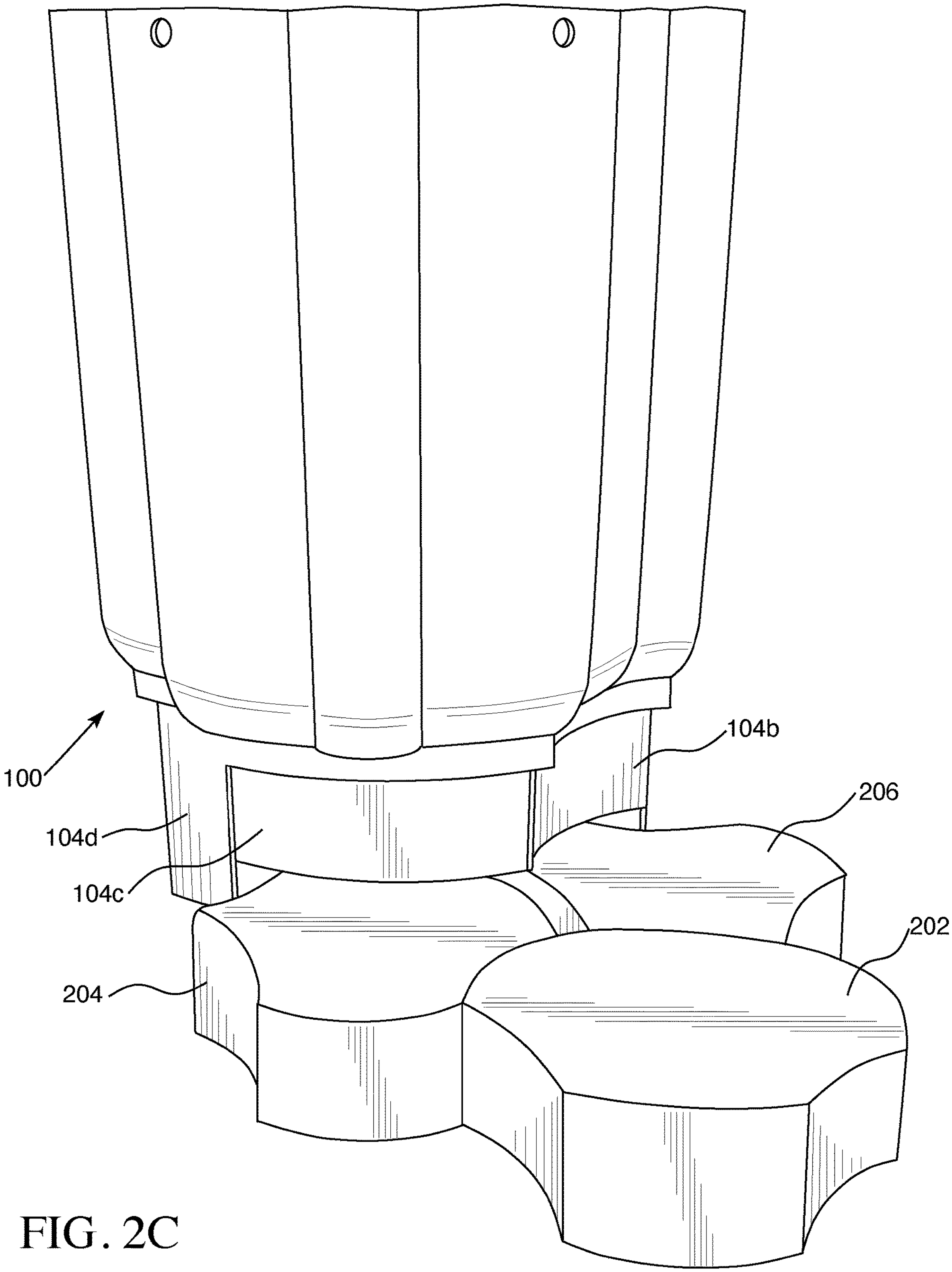

FIG. 2C depicts the first brick 202, second brick 204, third brick 206 (i.e., the "already-deposited" bricks), and the nozzle 100 in the process of depositing a fourth brick. When the fourth brick is being deposited, two of the nozzle walls, 104*b* and 104*c*, are lifted since they are adjacent to already-deposited bricks 206 and 204. In one embodiment, the bottom surfaces of the lifted walls 104*b* and 104*c* may rest on top of the respective bricks 206 and 204. The form for the fourth brick is provided by the remaining nozzle walls 104*a*, 104*d*, 104*c*, 104*f*, and one of the sides of each of the bricks 204, 206. During deposition of the fourth brick, the nozzle walls 104*a* and 104*d* that are on either side of the lifted walls 104*b* and 104*c* are in tight, direct contact with the already-deposited bricks 206 and 204, respectively, to prevent material from leaking out of a space between the bricks 204, 206 and the nozzle walls 104*a*, 104*d*. In this manner, the bricks are deposited directly adjacent to each other without any intervening layers or materials in between the bricks.

The bricks are deposited in a liquid, semi-liquid, semi-melted, or heated state so that, as the bricks cool, they will meld together and solidify. The bricks may also be surfaced in a fluxing agent prior to deposition in order to promote brick-to-brick adhesion.

The nozzle 100 may be attached to a machine or robot that moves the nozzle 100 in the x, y, and z directions. The machine may be programmed to automatically move the nozzle 100 into position for depositing bricks. After a brick is deposited, the machine may be programmed to move the nozzle up in the z direction and to move the nozzle in the x and y directions to a position directly adjacent to one side of the already-deposited brick. Once the nozzle is in the correct position, the nozzle wall that is adjacent to the one side of the already-deposited brick is lifted and the nozzle is moved down in the z direction.

The nozzle 100 may also be coupled to a sensor and a processor configured to determine which wall(s) of the nozzle 100 should be in the retracted position. In other words, the sensor is configured to determine the position of adjacent bricks and, based on those positions, the processor determines which one(s) of the moveable walls need to be in the lifted position during brick deposition.

The processor may be coupled to a controller configured for moving the nozzle walls up and down. The controller may be coupled to a mechanism for lifting the walls of the nozzle 100. The lifting mechanism may be coupled to the moveable walls and may include any type of linear actuator, such as springs, rollers, hydraulics, pneumatics, or the like. Alternatively, the walls of the nozzle 100 may be lifted manually during brick deposition. That is, the walls of the nozzle 100 that are adjacent to already-deposited bricks may be pushed up by resting on top of the already-deposited bricks while the rest of the nozzle is moved downward relative to the already-deposited bricks.

Figure 3:
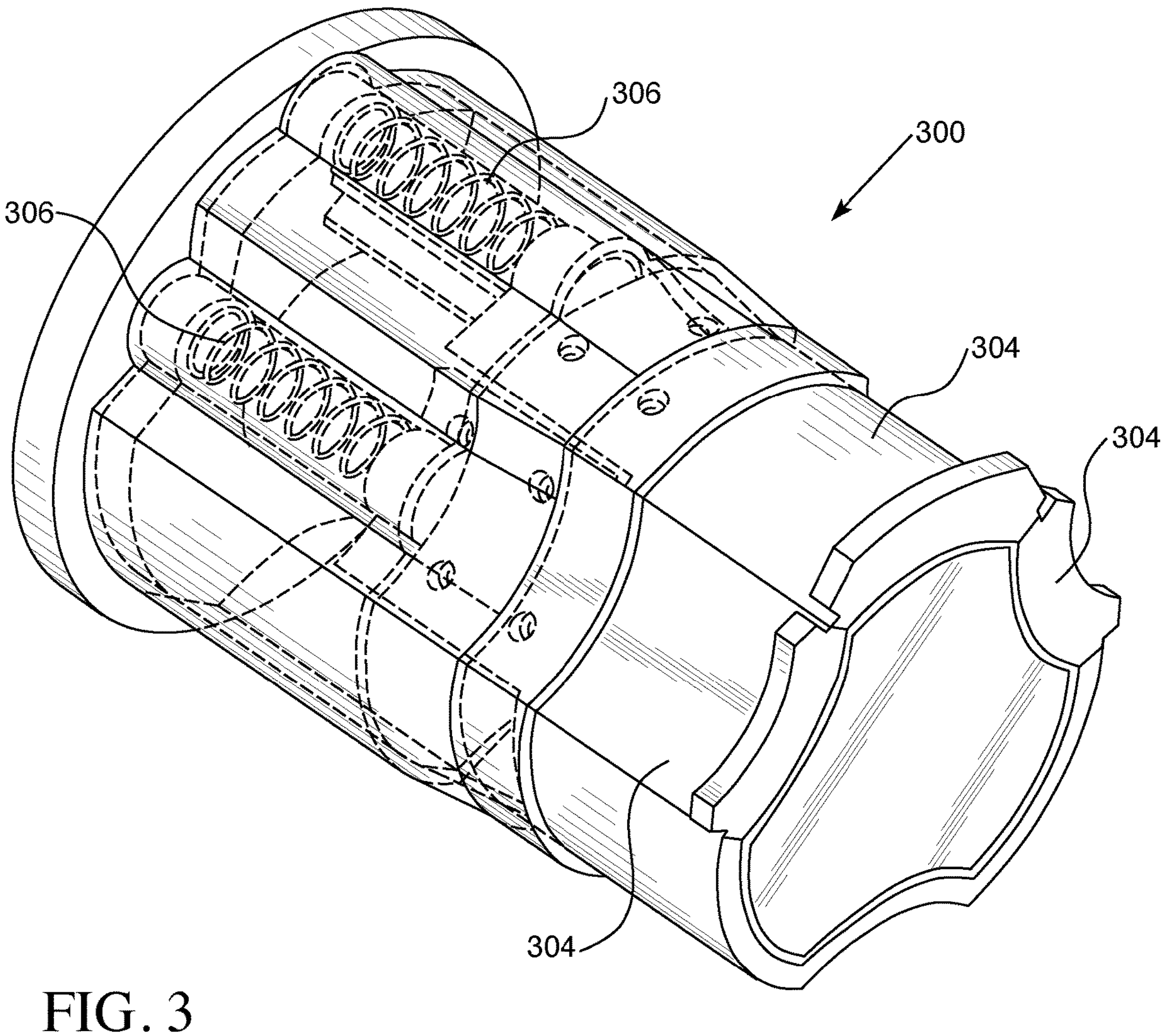
FIG. 3 is a perspective view of a nozzle having moveable walls and springs coupled to the moveable walls, in accordance with an embodiment of the present invention.

In one embodiment, shown in FIG. 3, a nozzle 300 with moveable walls 304 includes springs 306 (third spring not shown) coupled to the walls 304. The springs 306 are biased to be in the extended configuration shown in FIG. 3. The load required to compress the springs 306 is relatively small. When one of the moveable walls 304 comes into contact with an already-deposited brick, the pressure between the brick and the moveable wall 304 is sufficient to compress the spring 306, thereby allowing the wall 304 to move upwards relative to the other walls of the nozzle.

In another embodiment, the nozzle 300 may include a controller coupled to the springs 306. A processor and controller coupled to the springs 306 causes one or more of the springs 306 to compress, thereby lifting the wall(s) 304 associated with the compressed springs.

Figure 4A:
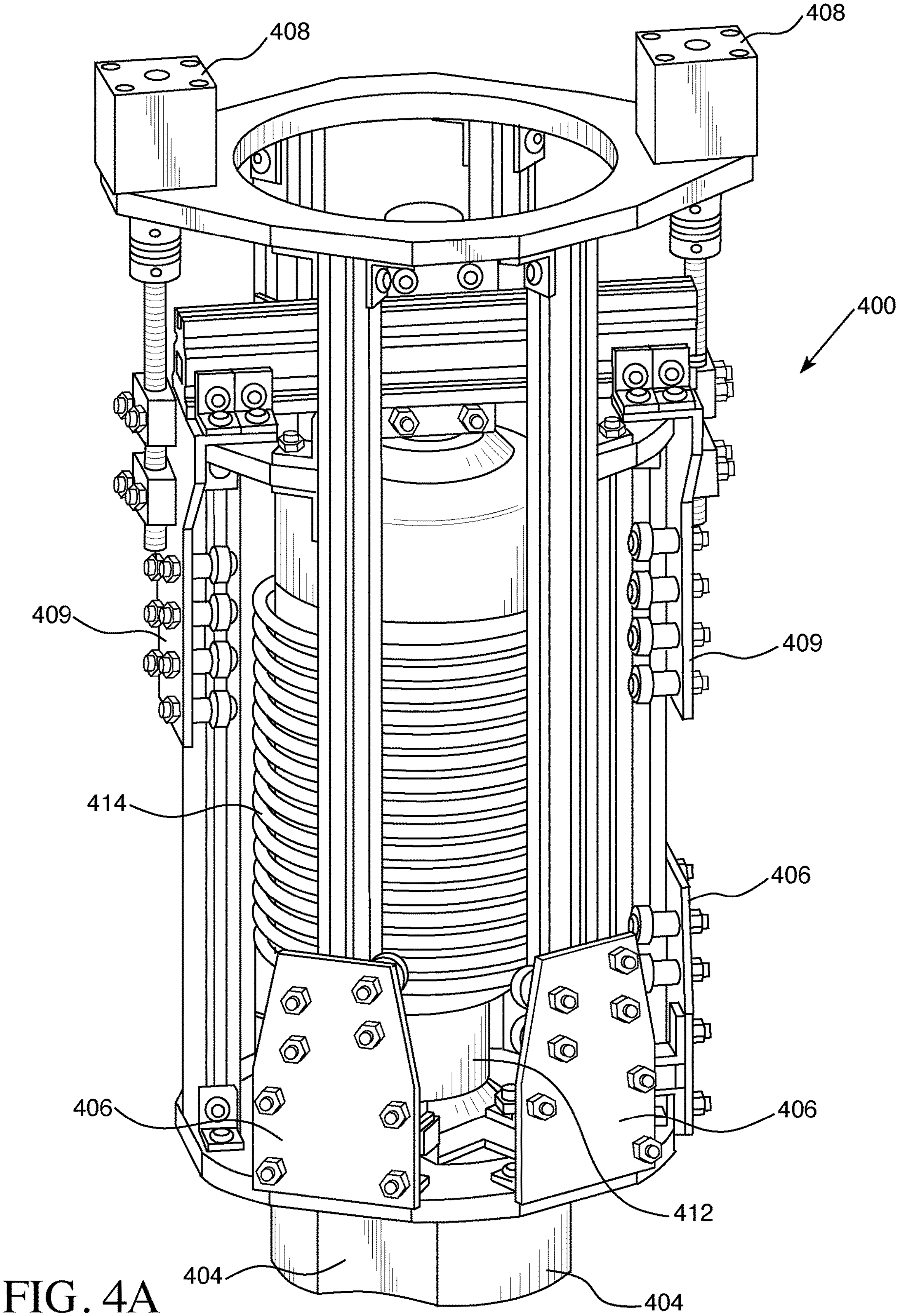
FIGS. 4A and 4B are perspective and front views, respectively, of a nozzle having moveable walls and rollers coupled to the moveable walls, in accordance with an embodiment of the present invention.
Figure 4B:
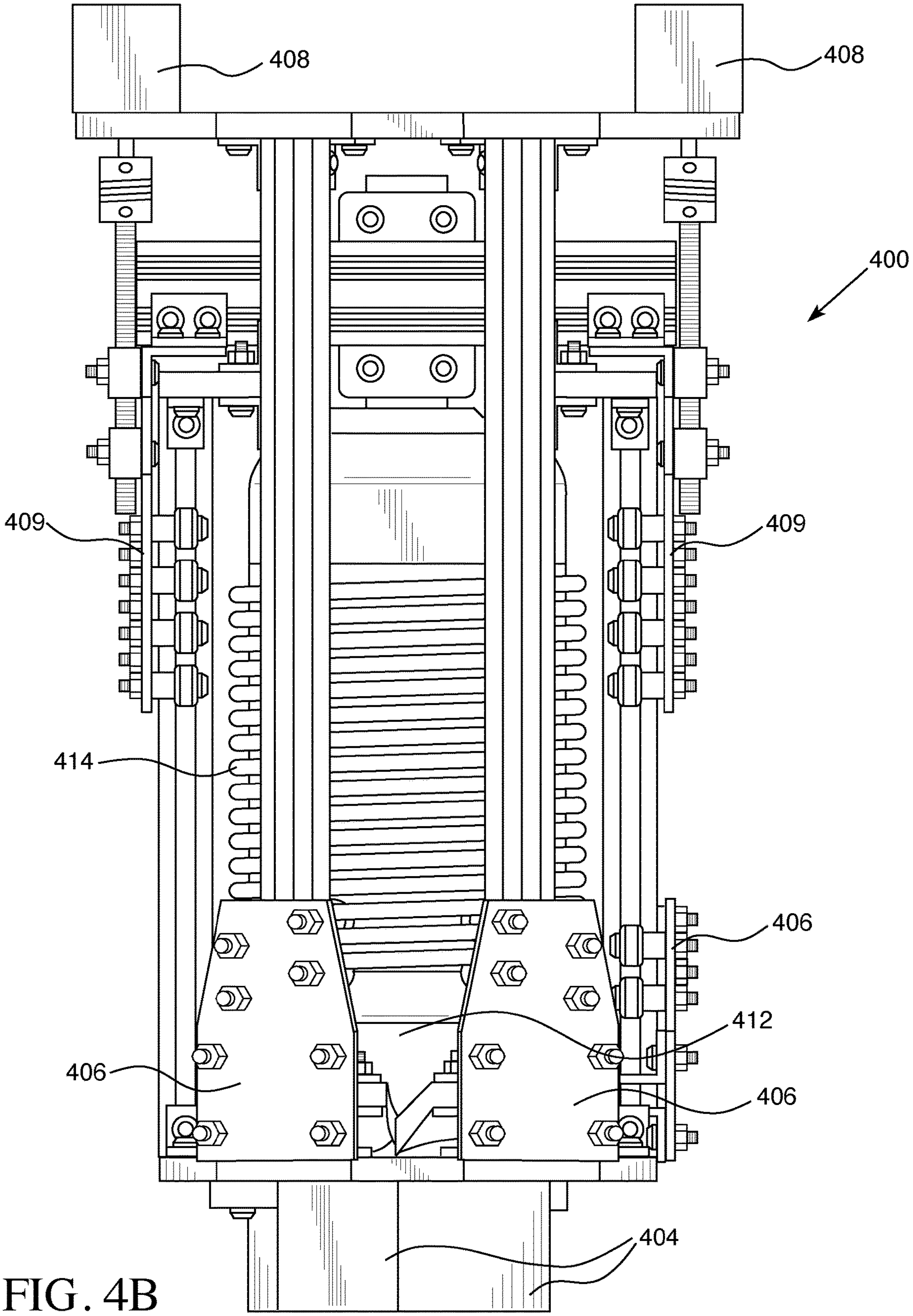

In another embodiment, shown in FIGS. 4A-4D, a nozzle 400 with moveable walls 404 includes rollers 406 coupled to the walls 404. Although the three sets of rollers 406 are depicted in FIGS. 4A and 4B, only two of the moveable walls 404 are visible in FIGS. 4A and 4B. After placing a brick, the nozzle 400 moves to another location adjacent to the deposited brick. In the adjacent location, the bottom lip, or bottom surface of one of the moveable walls 404 rests on, or directly above, the already-deposited brick. When the nozzle 400 is moved in the downward direction, the rollers 406 associated with the moveable wall 404 resting on the already-deposited brick move upward to retract the moveable wall 404.

In another embodiment, the rollers 406 may be coupled to a controller. When a processor determines that one or more of the walls 404 are required to be in the up position during deposition, the controller causes the rollers 406 to raise the appropriate walls.

Figure 4C:
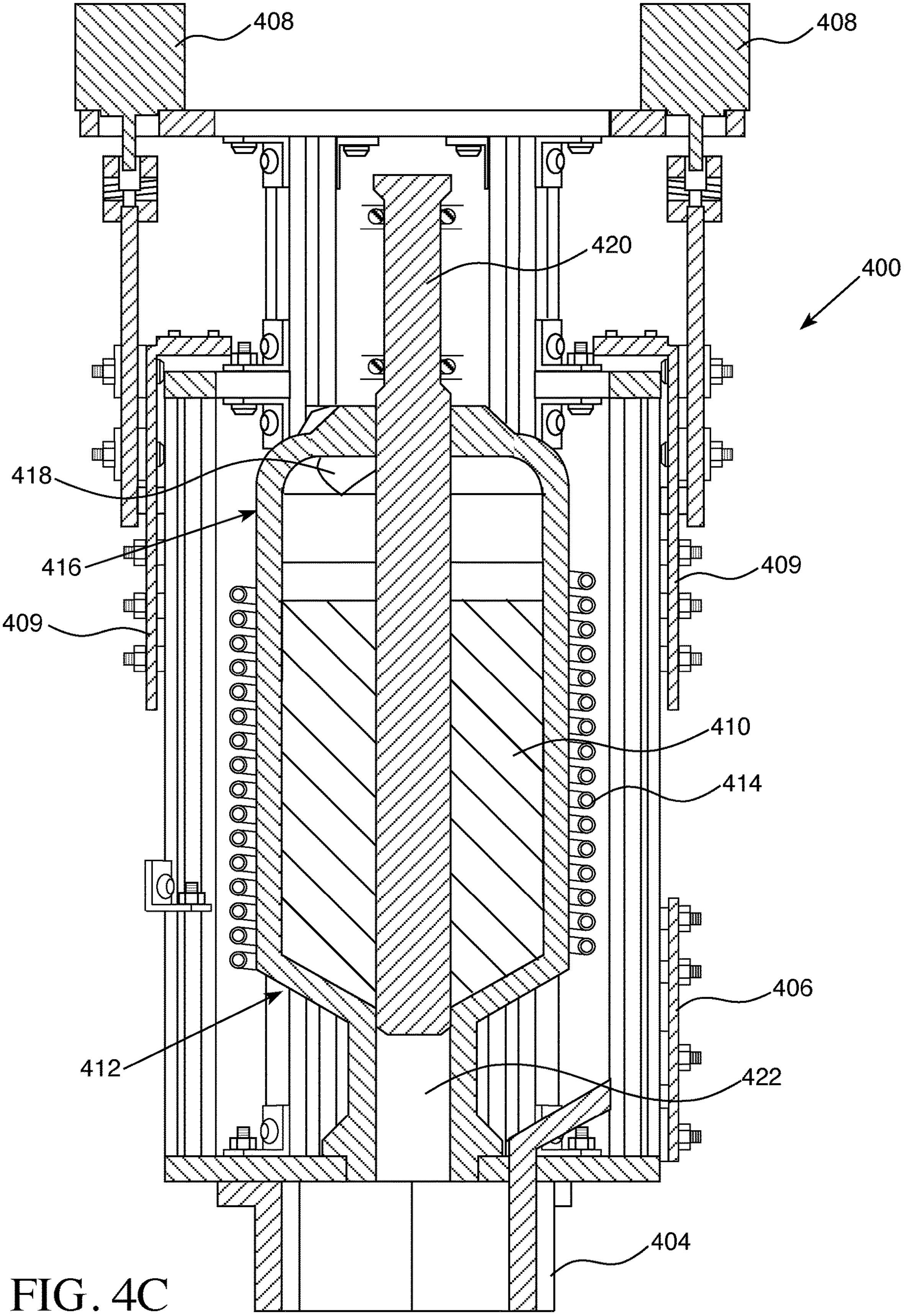
FIGS. 4C and 4D are cross-sectional views of the nozzle of FIGS. 4A and 4B with the nozzle stopper in the down position and the up position, respectively, in accordance with an embodiment of the present invention.
Figure 4D:
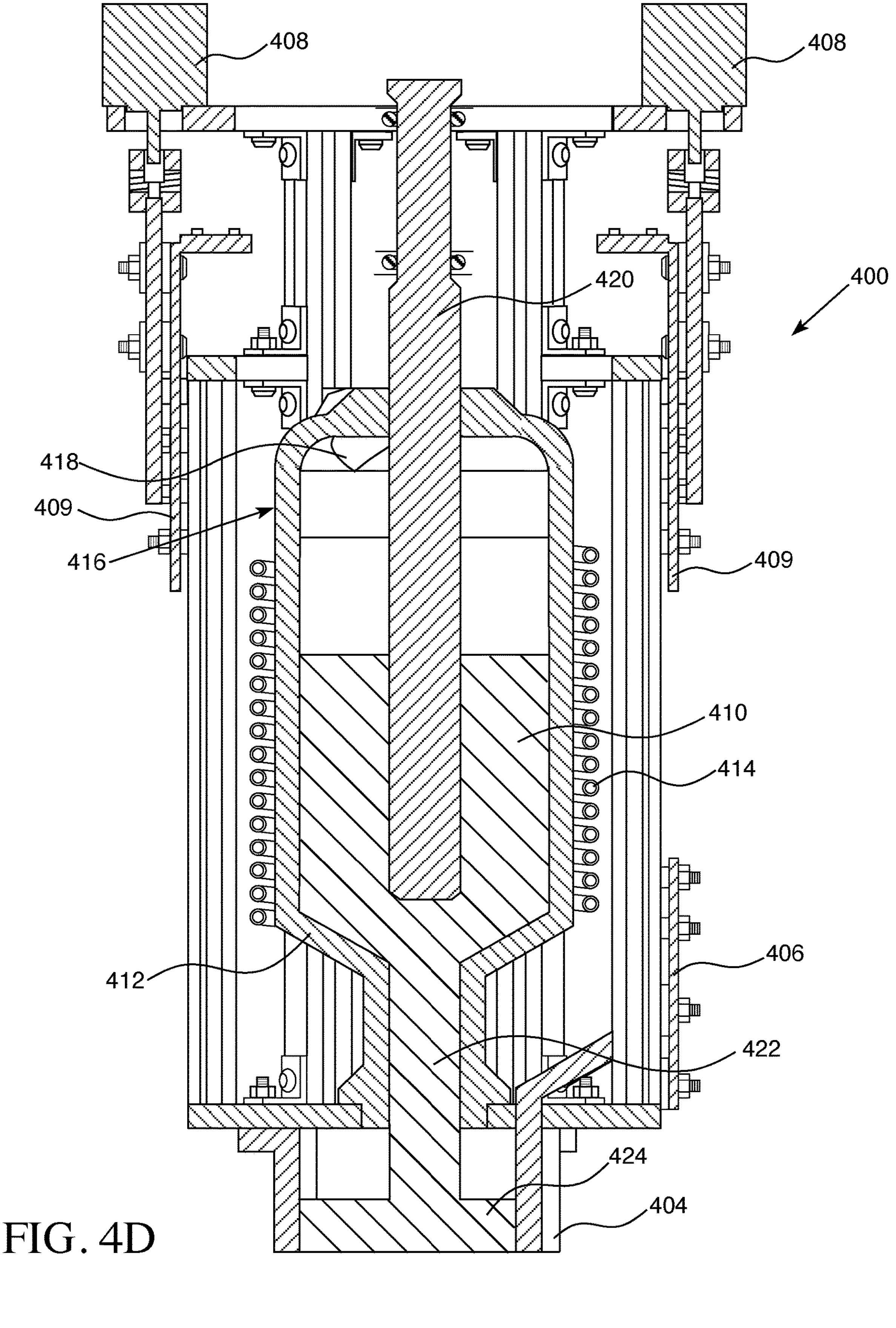

Referring now to FIGS. 4C and 4D, the material for forming the pavers is a molten material 410 that is held in a crucible, or conduit, 412 and heated by an induction coil or similar heating apparatus 414 that surrounds the crucible 412. The crucible 412 includes a crucible cap 416 and an opening 418 through which additional paver material can be added to the crucible 412. A stopper rod 420 extends through the center of the crucible 412 and functions to plug the outlet 422 and prevent molten material 410 from exiting the crucible 412, as shown in FIG. 4C. The stopper rod 420 is coupled to lift motors 408 and rollers 409. The lift motors 408 are activated to move the rollers 409 upwards or downwards, thereby causing the stopper rod 420 to raise or lower, respectively. When the stopper rod 420 is lifted, as shown in FIG. 4D, the molten material 410 is allowed to exit the crucible 412 and form a paver 424.

In another embodiment, shown in FIGS. 5A-5L, a nozzle 500 with moveable walls 504 includes a retraction mechanism 506 coupled to each wall 504. However, it should be well understood by one of ordinary skill in the art that one or more of the walls 504 may be stationary and thus not include a retraction mechanism 506. Each retraction mechanism 506 includes an upper portion having a dust cover 508 and a lower portion having a flexible bellows 510 for protecting the lower portion of the retraction mechanism 506 from dust and/or the elements.

Figure 5A:
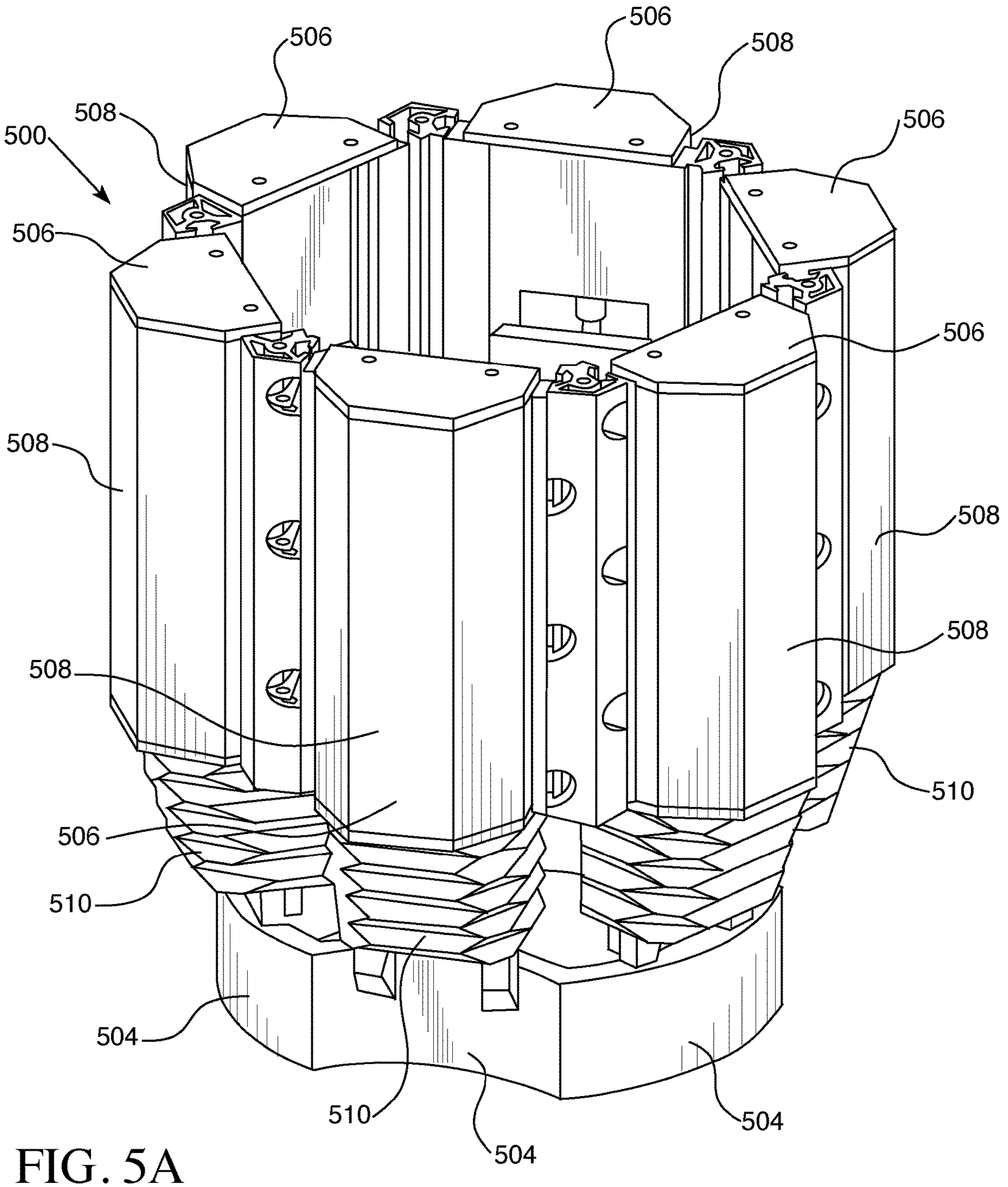
FIG. 5A is a perspective view of a nozzle having moveable walls in accordance with an embodiment of the present invention.
Figure 5B:
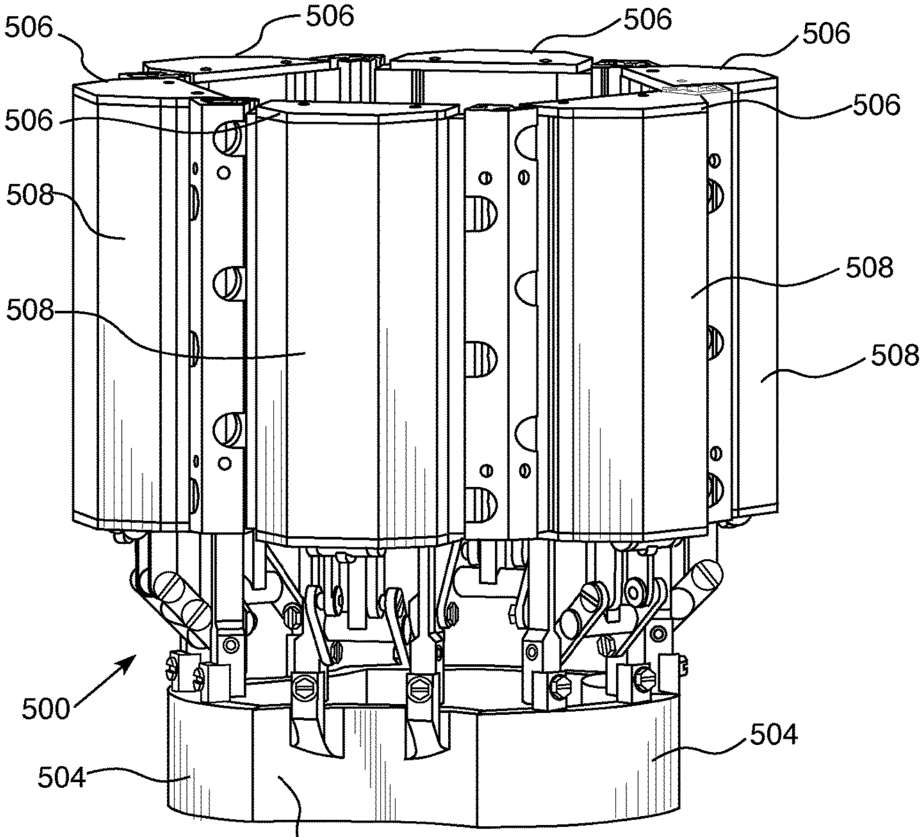
FIGS. 5B and 5C are perspective views of the nozzle of FIG. 5A with a flexible bellows removed and with the nozzle walls in extended and retracted positions, respectively.
Figure 5C:
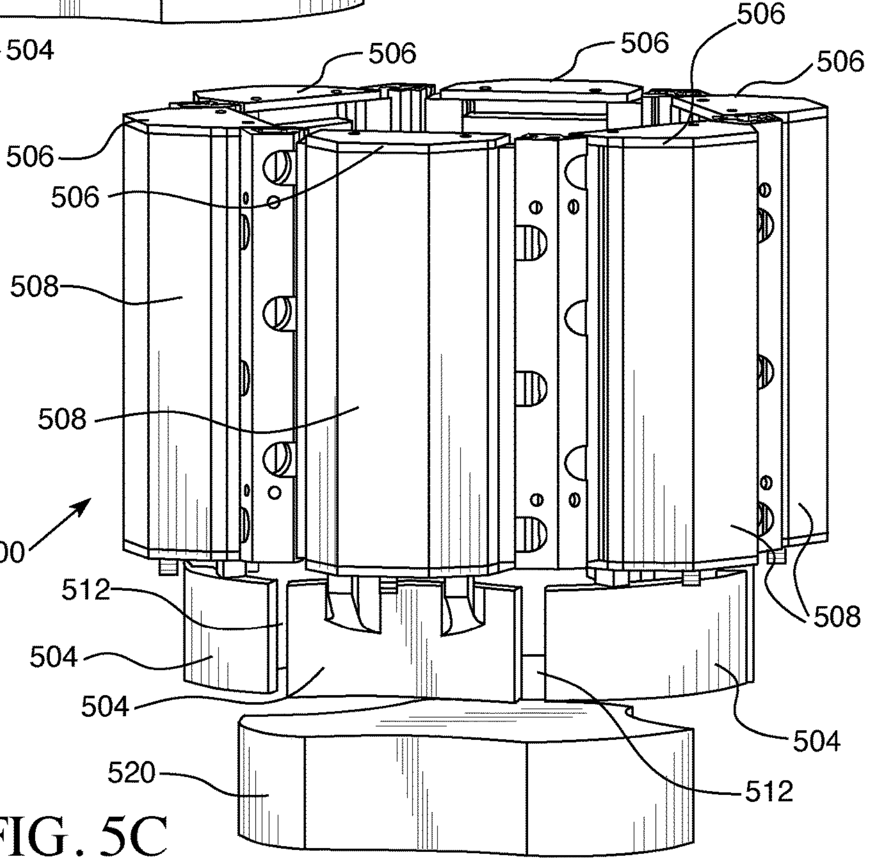
Figure 5D:
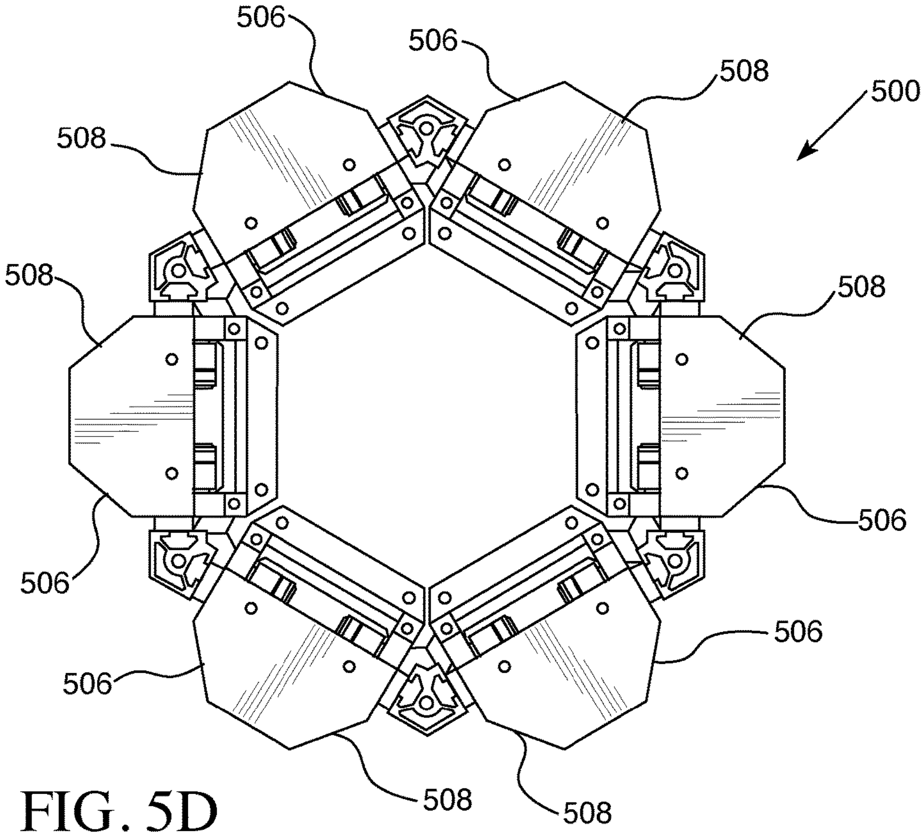
FIG. 5D is a top view of the nozzle of FIG. 5A.
Figure 5E:
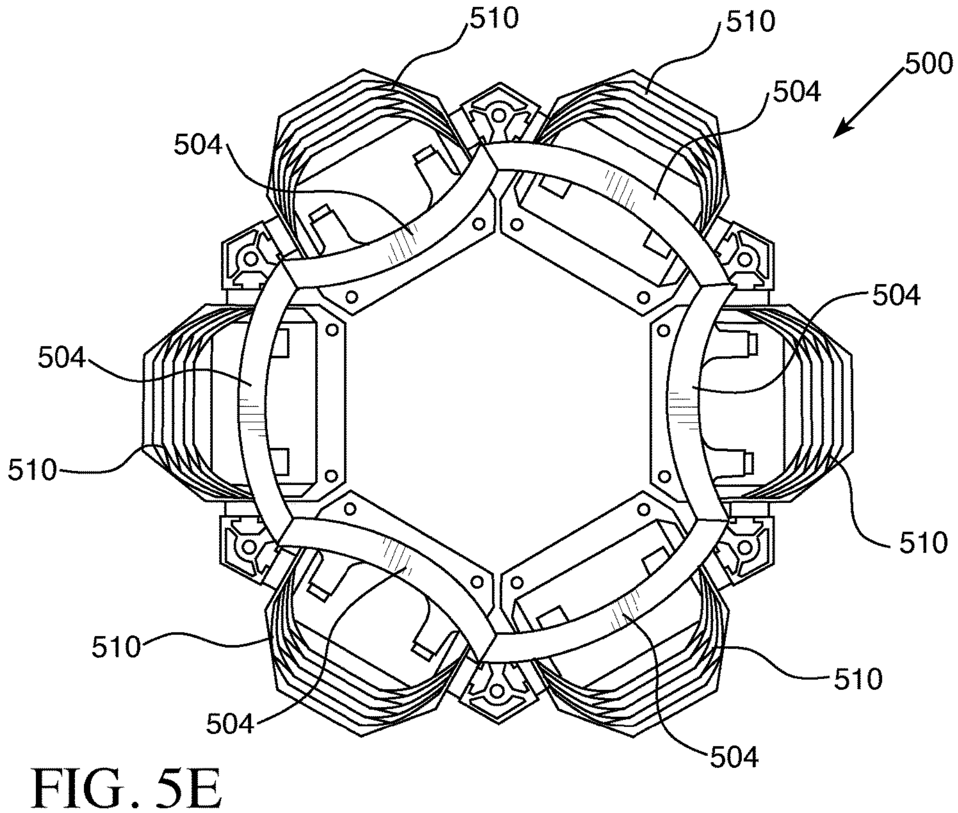
FIG. 5E is a bottom view of the nozzle of FIG. 5A.

FIGS. 5B and 5C illustrate the nozzle 500 with the flexible bellows 510 removed. FIG. 5B illustrates the nozzle 500 with all of the walls 504 in an extended position, and FIG. 5C illustrates the nozzle 500 with all of the walls 504 in a retracted position after depositing a brick 520. The retraction mechanism illustrated in FIGS. 5A-5L is configured to retract the walls 504 vertically and radially. That is, as the walls 504 are retracted, the walls 504 move upwards relative to the deposited bricks 520 and slightly radially outward relative to the deposited bricks 520. Due to the radial direction of the retraction, as shown in FIG. 5C, when the walls 504 are in the retracted position, there is a small space 512 between each wall. It has been found that the radial direction of the retraction may be advantageous if the material being deposited is particularly abrasive. In order to avoid too much friction and wear on the walls 504, it may be desirable to retract the walls 504 in a radial direction as well as a vertical direction. It should be well understood that the radial direction of the retraction is optional and that the walls 504 may alternatively be retracted vertically only.

The nozzle 500 illustrated in FIGS. 5A-5E includes six paddle assemblies. It should be well understood by one of ordinary skill in the art that the nozzle 500 may include any number of paddle assemblies, depending on the desired shape of the nozzle outlet. For example, the nozzle 500 may include 3, 4, 5, 7, 8, or more paddle assemblies.

Figure 5F:
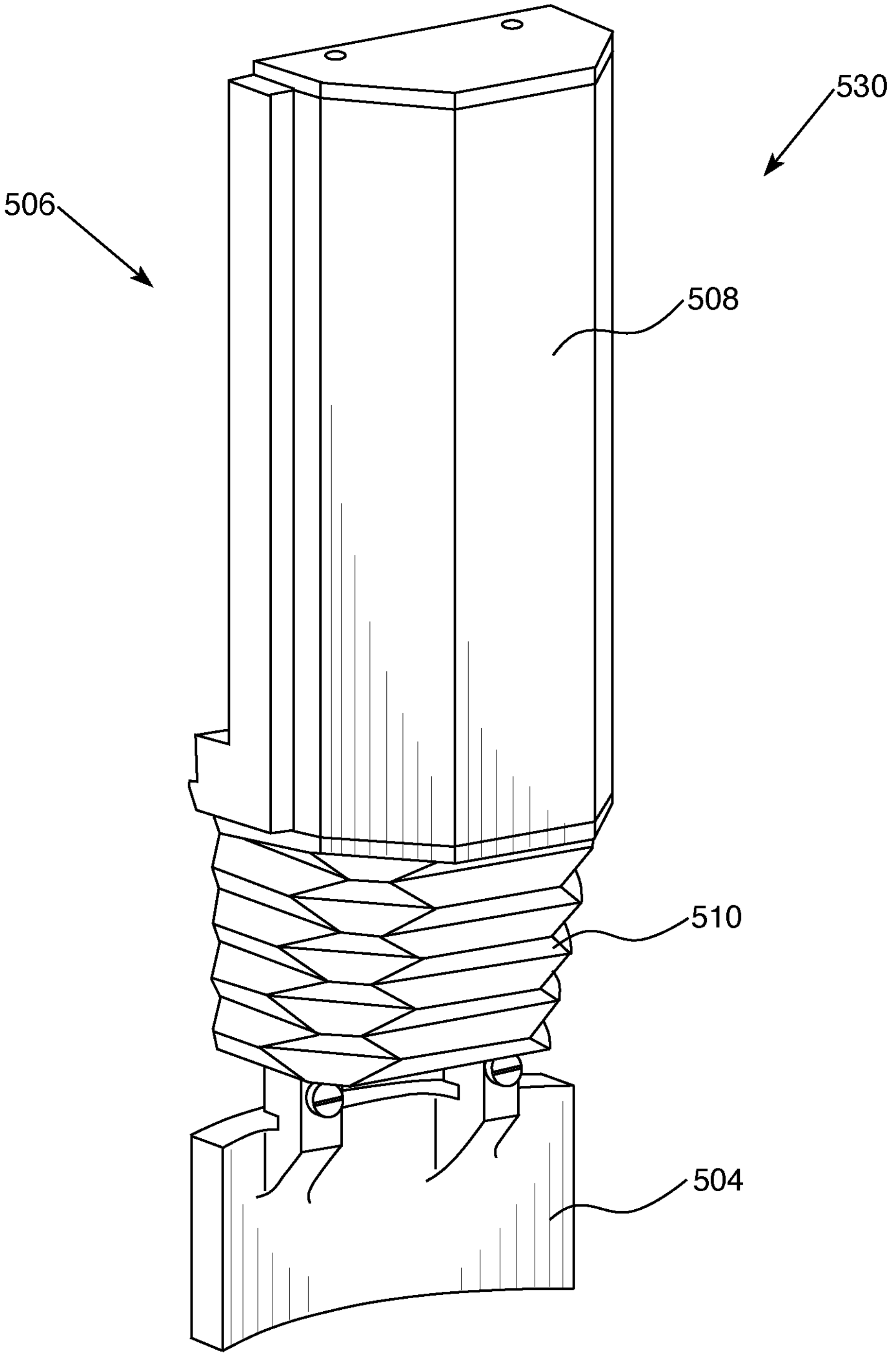
FIG. 5F is a perspective view of one of the paddle assemblies from the nozzle of FIG. 5A.
Figure 5G:
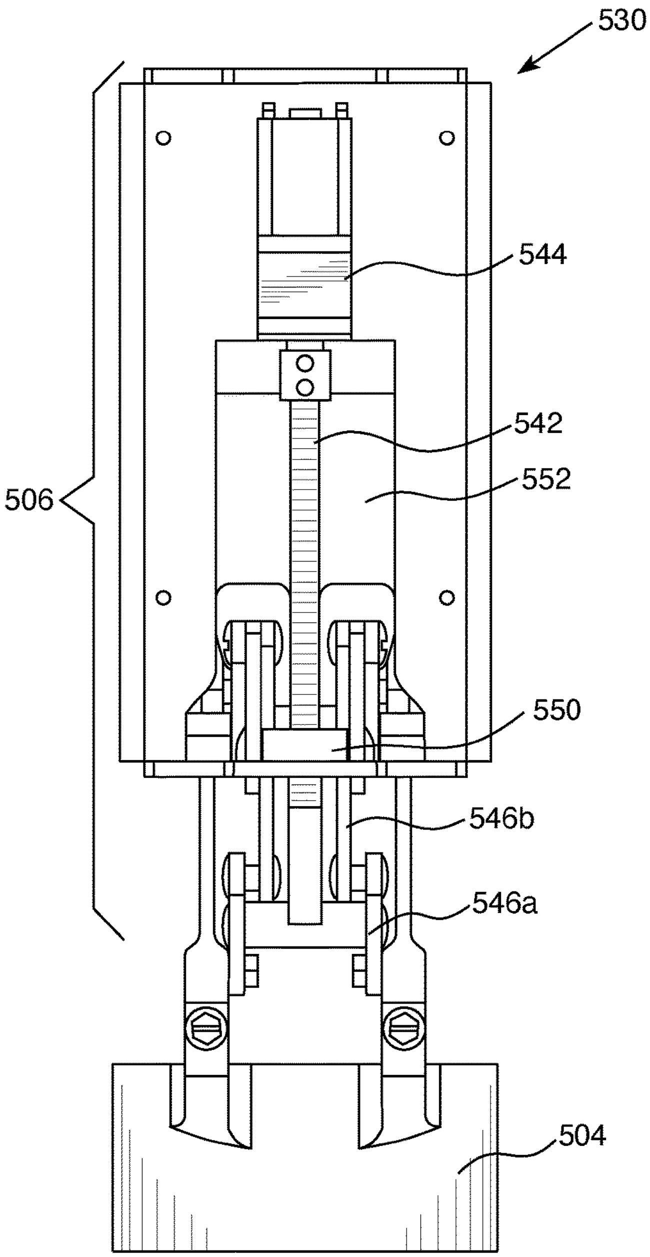
FIGS. 5G and 5H are front and side views, respectively, of the paddle assembly of FIG. 5F with the dust cover and flexible bellows removed and with the nozzle wall in an extended position.
Figure 5H:
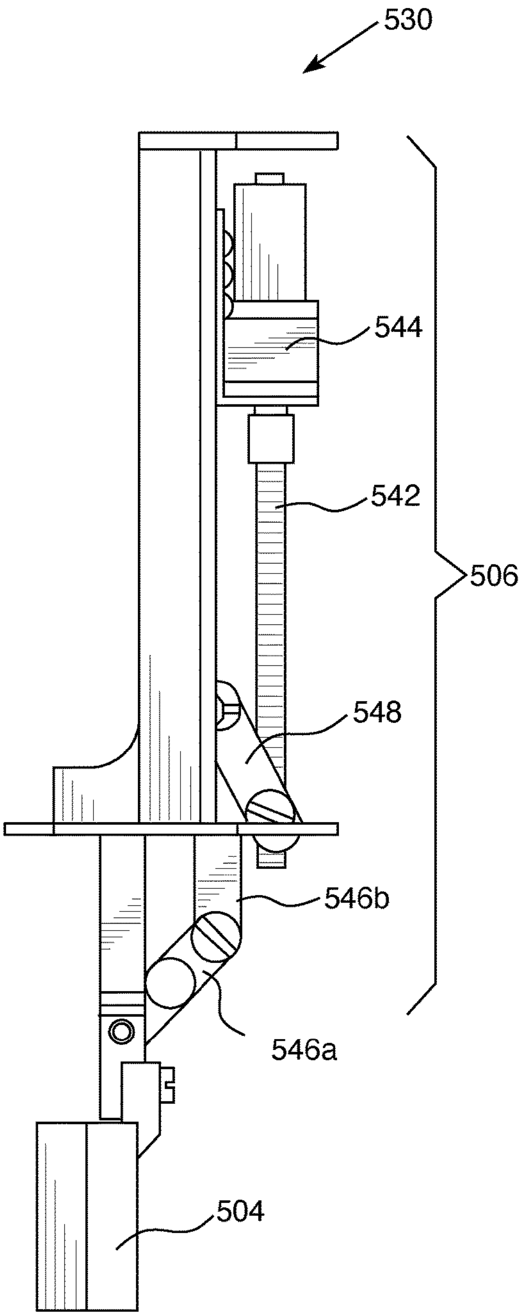
Figure 5I:
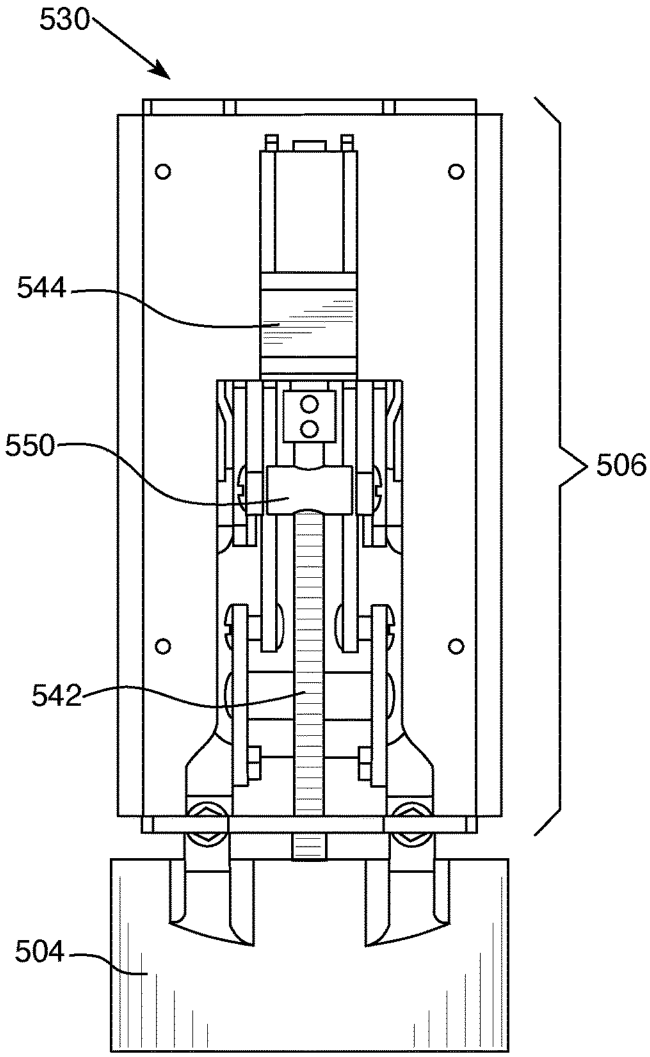
FIGS. 5I and 5J are front and side views, respectively, of the paddle assembly of FIG. 5F with the dust cover and flexible bellows removed and with the nozzle wall in a retracted position.
Figure 5J:
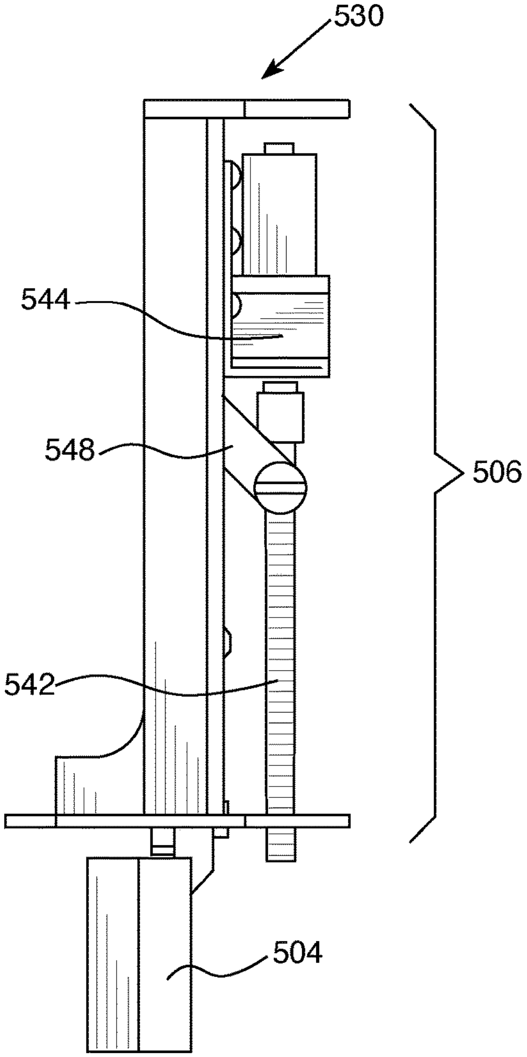

FIG. 5F depicts a single paddle assembly 530. FIGS. 5G-5L illustrate the paddle assembly 530 with the dust cover 508 and the flexible bellows 510 removed. Thus, the retraction mechanism 506 is shown in more detail in FIGS. 5G-5L.

The retraction mechanism 506 includes a drive screw 542 coupled to a motor 544 configured to rotate the drive screw 542. The drive screw 542 rotates in a first direction for retracting the wall 504 and in an opposite, second direction for extending the wall 504. The retraction mechanism 506 is not limited to a drive screw 542 for the linear actuator. It will be well understood that any other type of linear actuator may be used in the retraction mechanism. For example, the linear actuator may be mechanical, electro-mechanical, hydraulic, pneumatic, etc.

The drive screw 542 is also coupled to the wall 504 through a linkage comprising four bars **546*a*, 546*b*, 546*c*, 546*d* and a connector bar 548. The connector bar 548 is coupled to a threaded drive nut 550 that moves linearly up and down the drive screw 542 as the drive screw 542 rotates. The lifting mechanism 506 further includes a slider 552, shown in FIG. 5G. The slider 552 and the four bars 546 are coupled to tracks on either side of the paddle assembly 530. As such, the slider 552 and the four bars 546 maintain their alignment with each other by riding in the tracks during the up and down movement of the wall 504**.

Figure 5K:
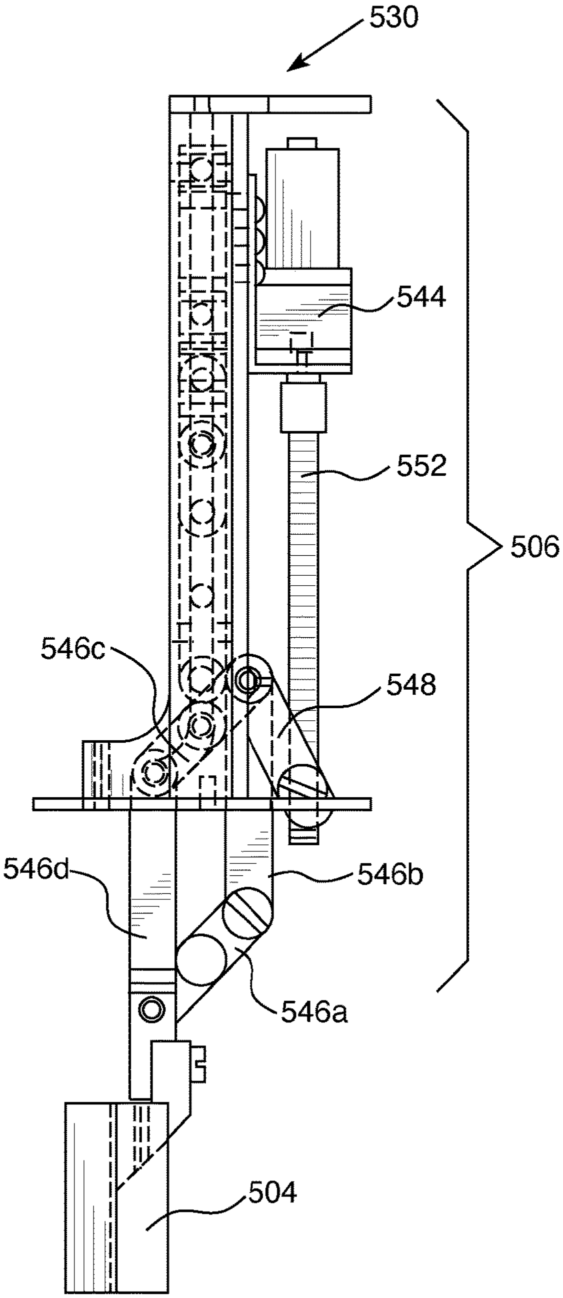
FIGS. 5K and 5L are side cross-sectional views of the paddle assembly of FIG. 5F with the dust cover and flexible bellows removed and with the nozzle wall in an extended position and a retracted position, respectively.
Figure 5L:
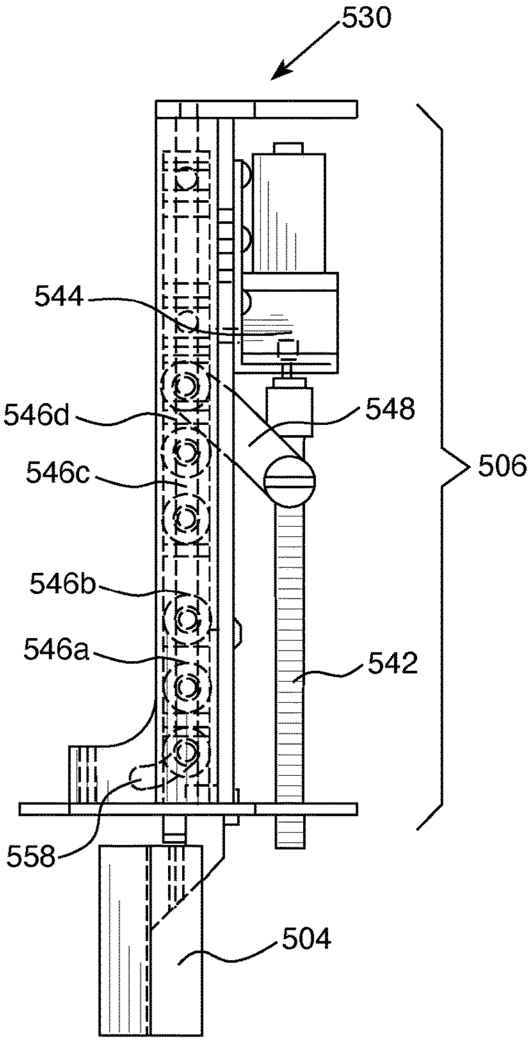

The configuration of the four bars 546 and the tracks can be seen more clearly in FIGS. 5K and 5L. The four bars 546 are hingedly attached to each other in a parallelogram shape when the wall 504 is in the extended position, as shown in FIG. 5K. Bars **546*b* and 546*d* are vertical and parallel to each other. Bars 546*a* and 546*c* are angled relative to the vertical bars 546*b*, 546*d* and are parallel to each other. When the wall 504 is in a retracted configuration, as shown in FIG. 5L, the four bars 546** rotate around the hinges until they are aligned with each other.

FIG. 5L also depicts the distal end of one of tracks 558 to which the bars 546 and the slider 552 are attached. The distal end of the track 558 is curved relative to the rest of the track 558, which is vertical. Due to the curvature at the distal end of the track 558, the wall 504 moves both radially and vertically. In another embodiment, the track 558 may be straight, thereby eliminating the radial movement of the wall 504. That is, rather than having a curved distal end, the track 558 may be completely vertical, which will cause the wall 504 to move straight up and down.

FIGS. 3-5L are exemplary embodiments of lifting mechanisms for lifting the moveable walls of the nozzle. It will be readily apparent to one of ordinary skill in the art that other lifting mechanisms are within the scope of this invention. For example, the moveable walls of the nozzle may be lifted and lowered along a variety of fixed or adaptive pathways using a set of linkages actuated by hydraulics, pneumatics, motors, spring tension, or the like.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and Bis false (or not present), A is false (or not present) and Bis true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. An apparatus for making and depositing bricks, the apparatus comprising:

a nozzle having an inlet opening, an outlet opening, and a conduit having a longitudinal axis extending between the inlet opening and the outlet opening, wherein the nozzle is configured so that brick material added to the nozzle through the inlet opening flows through the conduit and exits the nozzle through the outlet opening; and a plurality of walls surrounding the outlet opening, wherein each wall of the plurality of walls is parallel to the longitudinal axis of the conduit, and wherein at least one of the walls is configured to retract relative to the other walls along the longitudinal axis.

2. The apparatus of claim 1, wherein two of the walls are configured to retract relative to the other walls.

3. The apparatus of claim 1, further comprising at least one lifting mechanism coupled to the respective at least one wall that is configured to retract.

4. The apparatus of claim 3, wherein the at least one lifting mechanism comprises a linear actuator.

5. The apparatus of claim 1, wherein the outlet opening has a diameter of approximately 100-200 mm.

6. The apparatus of claim 1, wherein a plane of the outlet opening is perpendicular to the longitudinal axis of the conduit.

7. The apparatus of claim 1, wherein the plurality of walls comprises at least three walls.

8. The apparatus of claim 1, further comprising a plurality of vertices between the respective plurality of walls.

9. A method for making and depositing pavers, wherein the method comprises:

using a nozzle to deposit a first brick, wherein the nozzle comprises an inlet opening, an outlet opening, a longitudinal axis extending between the inlet opening and the outlet opening, and a plurality of walls surrounding the outlet opening, wherein at least one of the walls is configured to retract relative to the other walls along the longitudinal axis towards the inlet opening, and wherein all of the walls are in an extended position during deposition of the first brick;

moving the nozzle to a second location that is adjacent to the first brick;

retracting a first wall of the nozzle along the longitudinal axis towards the inlet opening so that the first nozzle wall is in a retracted position and the other nozzle walls are in the extended position, wherein the retracted first nozzle wall is directly above a first sidewall of the first brick; and depositing a second brick directly adjacent to the first brick so that a first sidewall of the second brick is in direct contact with the first sidewall of the first brick.

10. The method of claim 9, wherein the second brick is deposited in a side-by-side configuration relative to the first brick so that the entire first sidewall of the second brick is in direct contact with the entire first sidewall of the first brick.

11. The method of claim 9, wherein the nozzle comprises a lifting mechanism coupled to the first nozzle wall, and wherein retracting the first nozzle wall comprises activating the lifting mechanism.

12. The method of claim 9, further comprising:

moving the nozzle to a third location that is adjacent to the first brick and the second brick;

retracting the first nozzle wall and a second wall of the nozzle so that the first and second nozzle walls are in the retracted position and the other nozzle walls are in the extended position.

13. The method of claim 9, wherein the step of using the nozzle to deposit the first brick further comprises:

adding brick material to the nozzle through the inlet opening; and depositing the brick material out of the nozzle through the outlet opening.

* * * * *